United States Patent
Molteni et al.

(10) Patent No.: US 11,928,609 B2
(45) Date of Patent: Mar. 12, 2024

(54) NODE SHARING FOR A RULE ENGINE CODED IN A COMPILED LANGUAGE

(71) Applicant: RED HAT, INC., Raleigh, NC (US)

(72) Inventors: Luca Molteni, Milan (IT); Mark Proctor, London (GB)

(73) Assignee: RED HAT, INC., Raleigh, NC (US)

( * ) Notice: Subject to any disclaimer, the term of this patent is extended or adjusted under 35 U.S.C. 154(b) by 522 days.

(21) Appl. No.: 17/099,861

(22) Filed: Nov. 17, 2020

(65) Prior Publication Data
US 2022/0156616 A1    May 19, 2022

(51) Int. Cl.
| | |
|---|---|
| G06N 5/047 | (2023.01) |
| G06F 8/35 | (2018.01) |
| G06N 5/022 | (2023.01) |
| G06N 5/025 | (2023.01) |

(52) U.S. Cl.
CPC .............. *G06N 5/047* (2013.01); *G06F 8/35* (2013.01); *G06N 5/022* (2013.01); *G06N 5/025* (2013.01)

(58) Field of Classification Search
CPC .... G06N 5/00; G06N 5/02–025; G06N 5/046; G06N 5/047
USPC ...................................................... 706/45–48
See application file for complete search history.

(56) References Cited

U.S. PATENT DOCUMENTS

| | | | |
|---|---|---|---|
| 8,631,033 B2 | 1/2014 | Anderson et al. | |
| 8,832,710 B2 | 9/2014 | Mousseau et al. | |
| 10,395,177 B2 | 8/2019 | Dalmia et al. | |
| 2008/0172353 A1* | 7/2008 | Lim | G06F 16/24564 707/E17.014 |
| 2009/0063385 A1* | 3/2009 | Proctor | G06N 5/025 706/48 |
| 2009/0222386 A1* | 9/2009 | Proctor | G06N 5/025 706/48 |
| 2014/0195473 A1* | 7/2014 | Citeau | G06N 5/025 706/47 |
| 2015/0278699 A1 | 10/2015 | Danielsson | |

FOREIGN PATENT DOCUMENTS

CN          104966239 A          10/2015

OTHER PUBLICATIONS

Robert Doorenbos, "Production Matching for Large Learning Systems", 1995, Doctoral thesis, Carnegie Mellon University.*

(Continued)

*Primary Examiner* — Jue Louie
(74) *Attorney, Agent, or Firm* — Kilpatrick Townsend & Stockton LLP

(57) ABSTRACT

Aspects and features of the present disclosure can reconcile node sharing within a production rule network that is fully coded in a compiled language. As an example, the shared, stateless class can represent constraints shared by the alpha node of a rete network. Code can be post processed to create a shared stateless class defined in memory. When the rule engine is executed and the rule network is produced, the shared stateless class can be referenced to evaluate a constraint shared by a node of the production rule network, reducing the number of classes stored in memory. Garbage collection can be used within the shared stateless class, deleting objects from memory structure when no longer used, further improving storage efficiency.

20 Claims, 4 Drawing Sheets

(56) References Cited

OTHER PUBLICATIONS

Cirstea, H., et al., "Production Systems and Rete Algorithm Formalisation," Sep. 26, 2006, https://hal.inria.fr/inria-00099850/document.

Kambona K., "Reentrancy and Scoping in Rule Engines for Cloud-Based Applications," Jun. 2018, http://soft.vub.ac.be/Publications/2018/vub-soft-phd-18-02.pdf.

Sottara, D., et al., "A Configurable Rete-OO Engine for Reasoning with Different Types of Imperfect Information," IEEE Transactions on Knowledge and Data Engineering, 2010, 22(11):1535-1548, https://www.computer.org/csdl/journal/tk/2010/11/ttk2010111535/13rRUxAASWf.

\* cited by examiner

NODE SHARING FOR A RULE ENGINE CODED IN A COMPILED LANGUAGE

TECHNICAL FIELD

The present disclosure relates generally to computer systems and data processing among nodes of a computer system. More specifically, but not by way of limitation, this disclosure relates to computing resource optimization for software providing artificial intelligence to make automated determinations.

BACKGROUND

Developing and applying software rule engines can involve or use artificial intelligence (AI). AI is an area of research and development in computer science that enables computers to perform tasks marked by the complexities of perceiving an environment in order to take actions. A rule engine processes information by applying logical constructs for describing operations, definitions, conditions, and constraints that apply to some predetermined data to achieve a result. Various types of rule engines have been developed. Some rule engines implement a virtual network of operational logic nodes to apply many constructs to a knowledge-base of data. A representation of this network can be stored in memory for reference while the rule engine operates.

As an example, a rete rule engine implements a rete network, which can include object-type nodes, alpha nodes, left-input-adapter nodes, eval nodes, join nodes, not nodes, and terminal nodes. In a rete network, alpha nodes are responsible for evaluating constraints that are self-contained. Such constraints are also referred to as alpha constraints. Alpha nodes share these constraints with other nodes to eliminate redundancy in the virtual rete network.

DETAILED DESCRIPTION

Figure 1:
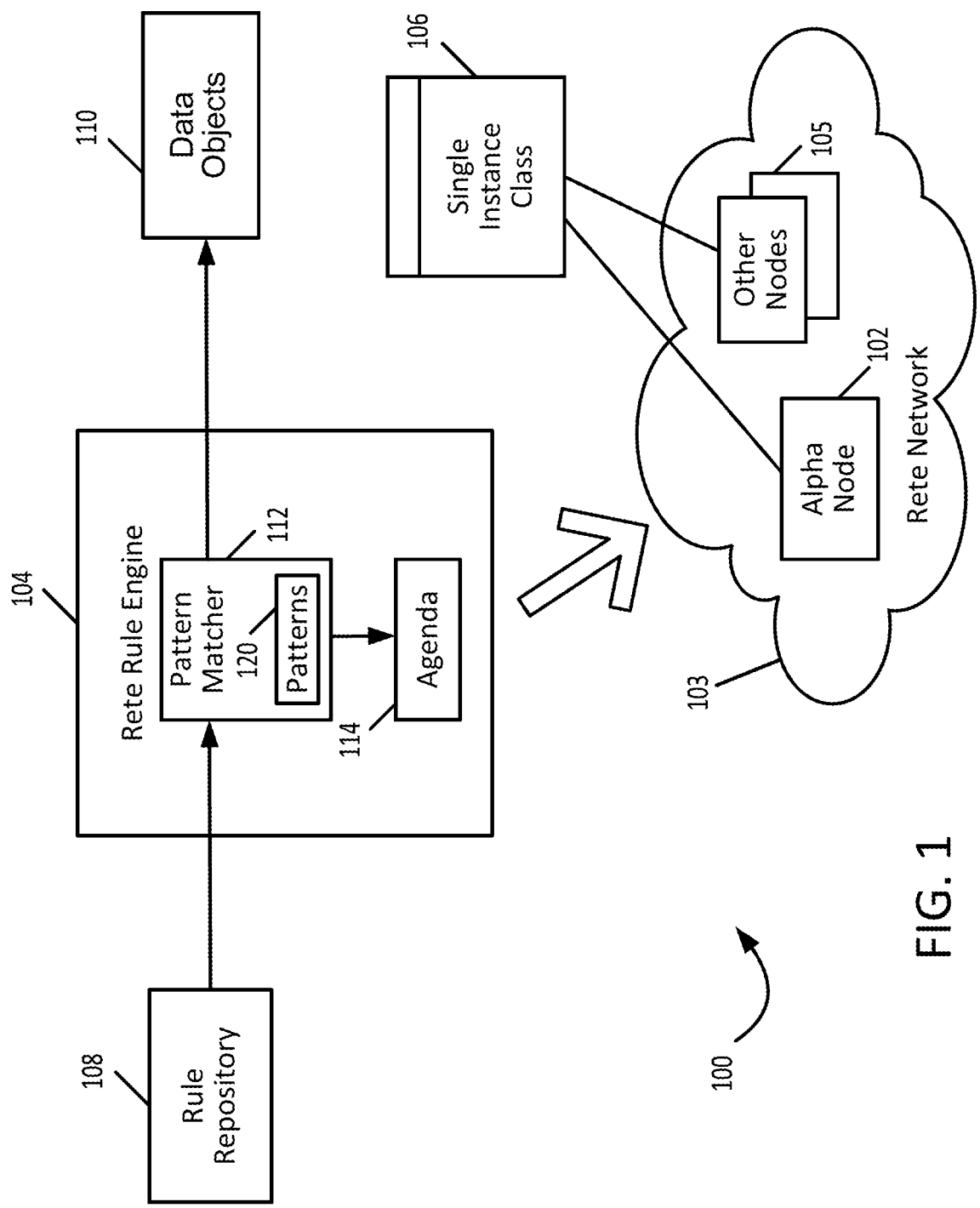
FIG. 1 is an entity diagram for an example of a system that provides node sharing for a rule engine according to at least some aspects of the disclosure.

A rule engine is a form of AI software that processes information by applying logical constructs to a knowledge-base of data to produce a result. Various types of rule engines have been developed. Some rule engines implement a virtual network of nodes to apply many constructs to the data. A node applies a rule to some part of the data and the result flows to the next node for processing. A representation of the network of nodes can be stored in memory for reference while the rule engine operates. Some rule engines use the nodes to apply complex rules, which are commonly referred to as production rules. Such a rule engine can be referred to as a production rule engine, and the virtual network created and stored by such a rule engine can be referred to as a production rule network.

A typical production rule engine provides node sharing, in which each alpha node shares a constraint and is maintained as unique. Node sharing by unique nodes can maximize logic evaluation efficiency. The alpha node can represent a constraint to be evaluated against a data object in some way. In a dedicated logic evaluation programming language, logic expressions can be interpreted at run time. For example, in Drools, a constraint for a production rule network can be stored as an expression language string, and that string can be evaluated at run time. The strings can be optimized so that having multiple similar constraints evaluated at run time does not adversely impact performance. Since the rule network is built in memory as the strings are interpreted, objects representing nodes that share constraints are not duplicated.

Implementing a rule engine using a compiled software language, as opposed to an interpreted software language, can be desirable. For example, the final implementation can execute faster because the code does not need to compile on the fly while the application is running. Also, the compiler can check for errors during compilation. But, when a production rule engine that creates a network of nodes is executed in a compiled language, for example, Java™ domain-specific language (DSL), the constraints shared by a node can create multiple object classes.

In Java™ DSL, for example, the constraints can be defined by lambda expressions. Each instance of such a constraint being shared can result in an object class written into memory, since the topology of the logic network is unknown until the code is compiled. Even though portions of the network representation can be shared for efficiency, the underlying code for these portions may not reflect sharing, resulting in significant memory inefficiency.

Some examples of the present disclosure overcome one or more of the issues mentioned above through reconciling node sharing within a production rule network that is coded in a compiled language. For example, the rule network can be defined by providing a model that is generated at compile time. The code can be post-processed, or programmatically examined after it has been compiled, using the model to create a shared stateless class that is defined in memory. The rule engine can be executed and the rule network can be produced. The shared stateless class can be referenced by the rule network to evaluate a constraint shared by a node of the production rule network. Defining a separate class for each instance of sharing a constraint can be avoided, resulting in reduced memory storage requirements for the production rule network.

In some examples, the post-processing can include calculating a digital fingerprint for the constraint, interpreting an enumeration pattern for the production rule engine, or both. For example, when using Java™, the digital fingerprint can be based on the body of the constraint as defined in a lambda expression and the Java™ enumeration pattern can be used to create a unique single-instance (singleton) class. Moreover, because the shared stateless class can maintain awareness of instances of constraint sharing, garbage collection can be used within the class, deleting objects created in the shared stateless class from the memory structure when no longer used, further improving memory efficiency.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is an entity diagram for an example of a system 100 that provides node sharing for a rule network for a production rule engine according to at least some aspects of the disclosure. Rete network 103 can be produced by rete rule engine 104 to include alpha node 102 and additional nodes 105. Rete rule engine 104 is communicatively coupled to a rule repository 108 and data objects 110. The rule repository 108 can store a set of rules. Constraints can be derived from the rules. The rule repository 108 may also be referred to as a production memory. The data objects 110 represent facts that have been asserted and stored for reference by the compiled code that implements rete network 103.

In this example, the rete rule engine 104 includes a pattern matcher 112 and an agenda 114. The pattern matcher 112 generates rete network 103 to evaluate the rules from the rule repository 108 against the data objects 110. Alpha node 102 can evaluate self-contained constraints. Facts propagating through the rete network 103 can be evaluated against the rules and constraints derived from the rules. Fully matched rules and constraints result in activations, which are placed into the agenda 114. The rete rule engine 104 can iterate through the agenda items to execute activations. The pattern matcher includes patterns 120 to be matched. As an example, as implemented in Java™ and similar compiled languages these patterns can be coded as enumeration patterns. An enumeration pattern provides a common form to a singleton class.

System 100 can store the constraints shared by the alpha node 102 of rete network 103 while substantially avoiding redundant data structures being stored in memory. Each of the other nodes 105 in rete network 103 can share constraints from alpha node 102 by referencing the single-instance class 106. Post-processing to create the single-instance class 106 can include evaluating the enumeration patterns 120 for the rule engine code to determine which enumeration patterns relate to constraints shared by alpha nodes.

Figure 2:
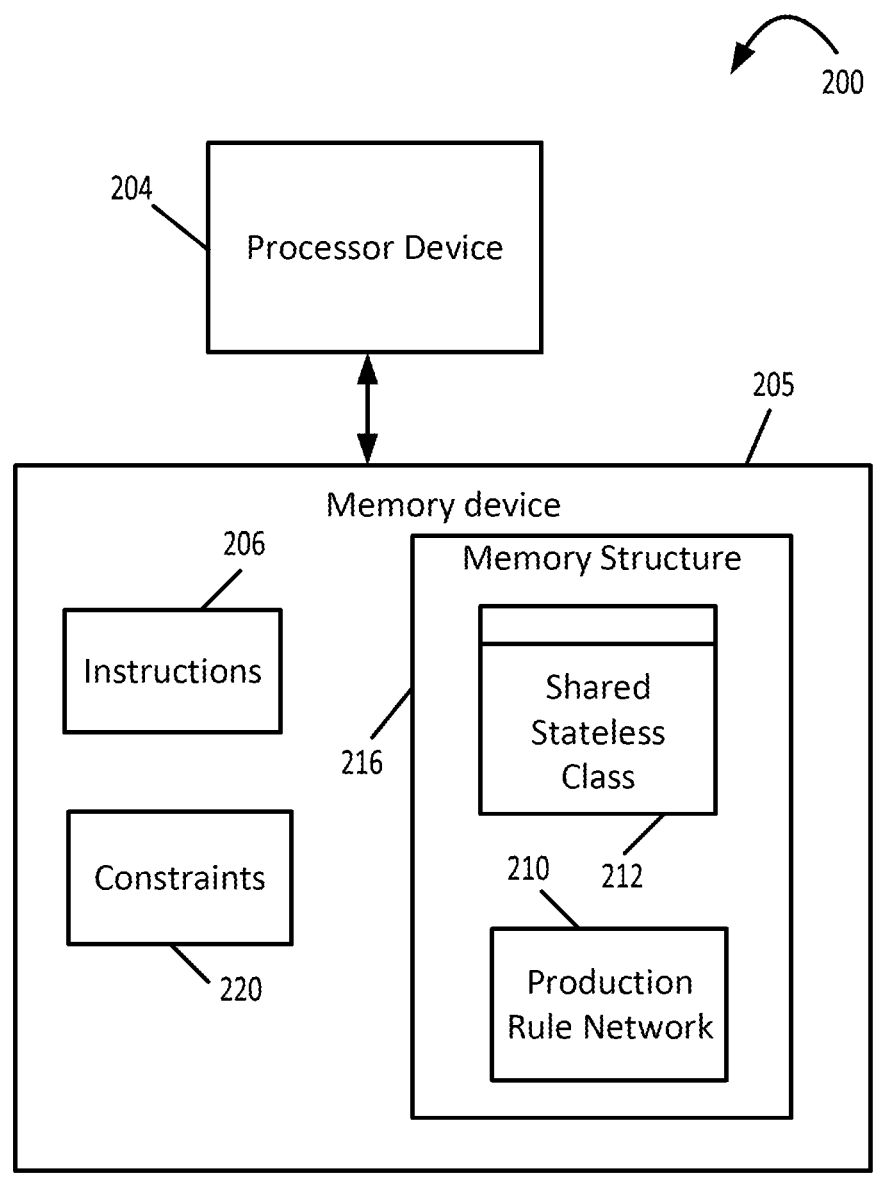
FIG. 2 is a block diagram of an example of a system that provides node sharing for a rule engine according to at least some aspects of the disclosure.

FIG. 2 is a block diagram of an example of a system 200 that provides node sharing for a rule engine coded in a compiled language according to some aspects of the disclosure. The system 200 includes the processor device 204. Processor device 204 can execute computer program code, also referred to as instructions or program code instructions, for performing operations related to node sharing for a rule engine coded in a compiled language. Processor device 204 is communicatively coupled to the memory device 205. The processor device 204 can include one processor device or multiple processor devices. Non-limiting examples of the processor device 204 include a field-programmable gate array (FPGA), an application-specific integrated circuit (ASIC), a microprocessor, etc. The processor device 204 can execute one or more operations for compiling or executing program code instructions 206 stored in the memory device 205. Computer program code instructions 206 can include executable instructions to produce a production rule network 210 with the shared stateless class 212 in a memory structure 216. Processor device 204 references the shared stateless class 212 to evaluate constraints 220 shared by a node of the production rule network.

Memory device 205 of system 200 can include one memory device or multiple memory devices. The memory device 205 can be non-volatile and may include any type of memory device that retains stored information when powered off. In some examples, at least some of the memory device can include a non-transitory computer-readable medium from which the processor device 204 can read instructions 206. A computer-readable medium can include electronic, optical, magnetic, or other storage devices capable of providing the processor device with computer-readable instructions 206 or other program code. Non-limiting examples of the memory device 205 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions. Although FIGS. 1 and 2 depict a certain arrangement of components for illustrative purposes, other examples can include any number and combination of these components arranged in any suitable configuration.

Figure 3:
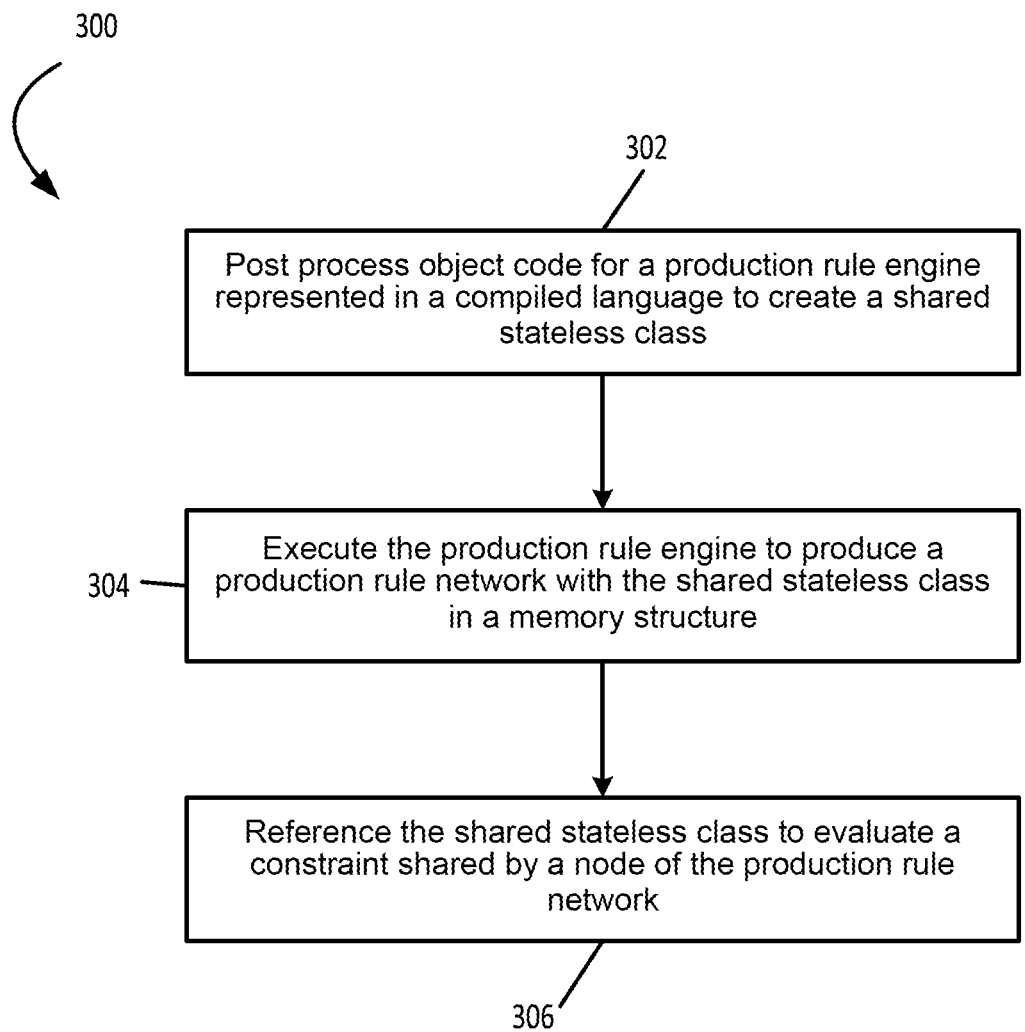
FIG. 3 is a flowchart of an example of a process for providing node sharing for a rule engine according to at least some aspects of the disclosure.

In some examples, a processor device such as processor device 204 can perform one or more of the operations shown in FIG. 3 to provide node sharing for a rule engine coded in a compiled language according to some aspects of the disclosure. In other examples, the processor device can implement more operations, fewer operations, different operations, or a different order of the operations depicted in FIG. 3. Process 300 of FIG. 3 is described below with reference to components discussed above.

At block 302, processor device 204 post processes code for a production rule engine represented in a compiled language. Processor device 204 creates a shared, stateless class for a shared constraint. At block 304, the production rule engine is executed to produce a production rule network with the shared stateless class, and both are stored in a memory structure. At block 306, processor device 204 references the shared stateless class to evaluate a constraint shared by a note of the production rule network. For example, the stateless class can be used to evaluate constraints shared by an alpha node so that classes are not created in memory for multiple nodes to be able to share the constraints. The stateless class can be used by multiple nodes to evaluate shared constraints.

Figure 4:
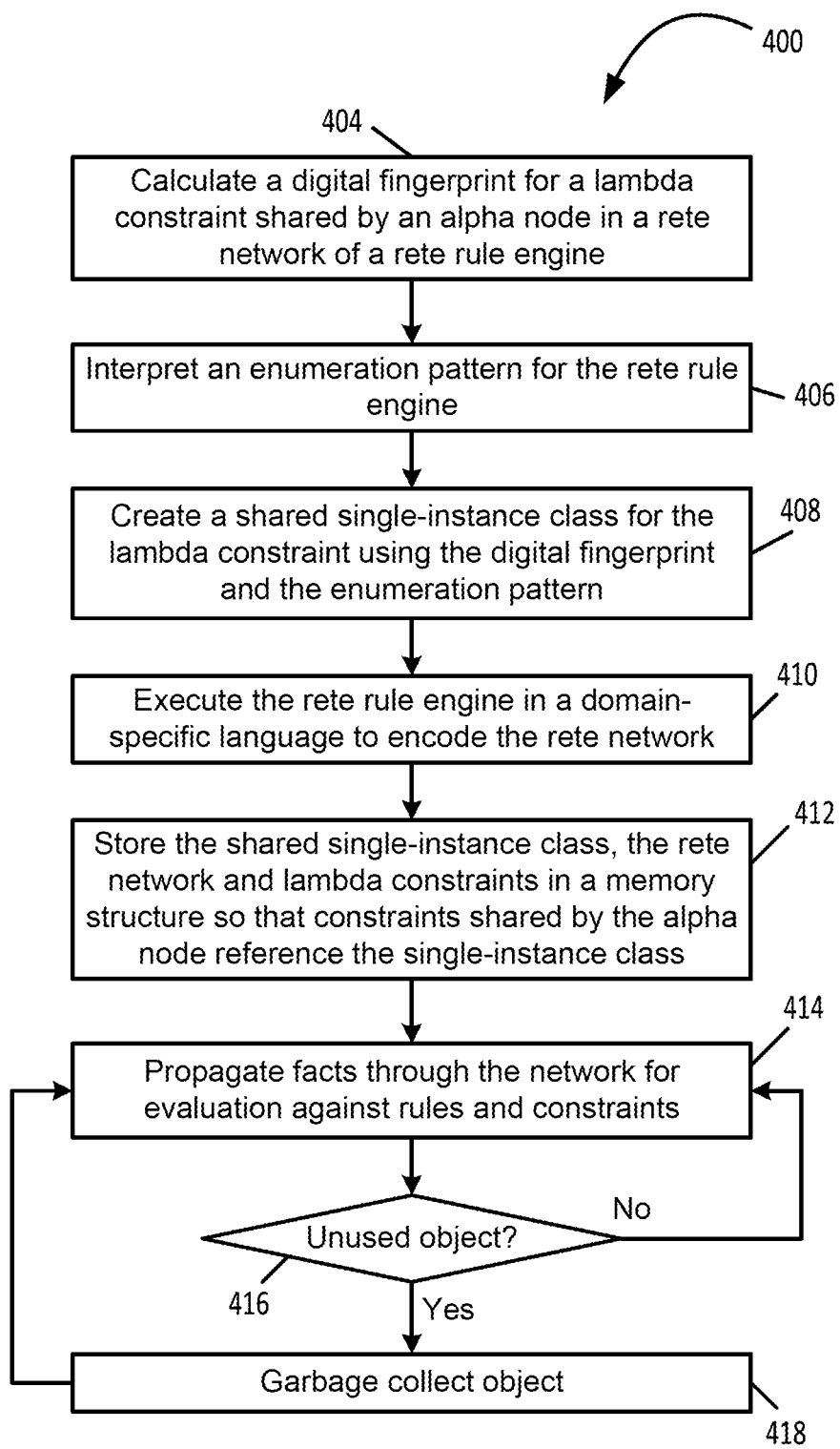
FIG. 4 is a flowchart of another example of a process for providing node sharing for a rule engine according to at least some aspects of the disclosure.

In some examples, a processor device can perform one or more of the operations shown in FIG. 4 to provide alpha node sharing for a rete rule engine coded in a compiled language such as Java™ DSL according to some aspects of the disclosure. Process 400 of FIG. 4 is described with reference to entities shown in FIG. 1.

At block 404 of process 400, the processor device calculates a digital fingerprint for a lambda constraint shared by alpha node 102 in a rete network 103 for rete rule engine 104. A digital fingerprint is a relatively short set of characters that uniquely identify a data structure. The digital fingerprint can be calculated by applying a high-performance hash function to the lambda constraint. The digital fingerprint is based on the body of the constraint as defined in a lambda expression.

At block 406, the processor device interprets an enumeration pattern from the patterns 120 stored in pattern matcher 112 of the rete rule engine 104. At block 408, the processor device creates a shared, single-instance class, or singleton class, 106 for the lambda constraint using the digital fingerprint and the enumeration pattern. At block 410, the processor device executes the rete rule engine in a domain specific language to encode the rete network.

At block 412, the shared, single-instance class, the rete network, and lambda constraints are stored in memory so that constraints shared by the alpha node are available to other nodes in the rete network. At block 414, the rete network 103 can be used to provide rule-based services. The processor device evaluates facts propagating through the network against rules and constraints. Constraints can be shared by an alpha node such as alpha node 102. As the rete network operates, if an unused object is detected at block 416, such as by the garbage collection normally supported in Java™, the object is collected, or removed from memory, at block 418. Thus, data objects can be removed based on usage to save additional memory resources. Otherwise, processing returns to block 414.

Node sharing for a rule engine coded in Java™ DSL can be provided according to at least some aspects of the disclosure. A typical rete network in a production rule system provides node sharing, in which each alpha node that shares the same constraint is kept unique to maximize evaluation efficiency. An alpha node represents a constraint to be evaluated. In a Drools platform the constraint can be stored as an expression language string, using the multivariable flex extension language (MVEL) syntax and is evaluated at runtime, i.e. "name==Mark".

When a rete engine is coded in Java™ DSL, lambda constraints can be referenced and memory can be allocated for each use of a constraint, even if the constraint is shared by an alpha node. For example, the Java™ DSL memory allocation might include an InvokeDynamic for each use of the lambda constraint, copies of the lambda constraints themselves, and the class containing the rule structure of interest for each use of the constraint. By using the singleton class as described herein for any constraint shared by an alpha node, the separate classes for each use of the shared constraint, and the memory associated those classes, are both eliminated.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
   a processor device; and
   at least one memory device including instructions that are executable by the processor device for causing the processor device to perform operations comprising:
   defining a constraint using a lambda expression;
   calculating a digital fingerprint based on the constraint;
   producing, using the digital fingerprint, a shared stateless class for a production rule engine represented in a compiled language;
   executing the production rule engine to store a production rule network and the shared stateless class in the at least one memory device, the production rule network including a node configured to share the constraint; and
   referencing the shared stateless class to evaluate the constraint shared by the node.

2. The system of claim 1, wherein the digital fingerprint is based on a body of the constraint.

3. The system of claim 2, wherein the operations further comprise interpreting an enumeration pattern for the production rule engine, and wherein the shared stateless class is based on the enumeration pattern and the digital fingerprint.

4. The system of claim 3, wherein the shared stateless class comprises a single-instance class for the production rule engine represented in the compiled language.

5. The system of claim 1, wherein the production rule network comprises a rete network and the node comprises an alpha node in the rete network.

6. The system of claim 5, wherein the compiled language is a domain-specific language.

7. The system of claim 1, wherein the operations further comprise deleting an object created in the shared stateless class from the at least one memory device based on usage of the object.

8. A method comprising:
   defining, by a processor device using a lambda expression, a constraint;
   calculating, by the processor device, a digital fingerprint for the constraint;
   producing, by the processor device using the digital fingerprint, a shared stateless class for a production rule engine represented in a compiled language;
   executing, by the processor device, the production rule engine to store a production rule network and the shared stateless class in memory, the production rule network including a node configured to share the constraint; and
   referencing, by the processor device, the shared stateless class to evaluate the constraint shared by the node.

9. The method of claim 8, further comprising interpreting an enumeration pattern for the production rule engine, wherein the shared stateless class is based on the enumeration pattern and the digital fingerprint.

10. The method of claim 9, wherein the shared stateless class comprises a single-instance class for the production rule engine represented in the compiled language.

11. The method of claim 8, wherein the production rule network comprises a rete network and the node comprises an alpha node in the rete network.

12. The method of claim 11, wherein the compiled language is a domain-specific language.

13. The method of claim 8, further comprising deleting an object created in the shared stateless class from the memory based on usage of the object.

14. A non-transitory computer-readable medium comprising program instructions that are executable by a processor device for causing the processor device to:
   define a constraint using a lambda expression;
   calculate a digital fingerprint for the constraint;
   produce, using the digital fingerprint, a shared stateless class for a production rule engine represented in a compiled language;
   execute the production rule engine to store a production rule network and the shared stateless class in memory, the production rule network including a node configured to share the constraint; and
   reference the shared stateless class to evaluate the constraint shared by the node.

15. The non-transitory computer-readable medium of claim 14, wherein the digital fingerprint is based on a body of the constraint.

16. The non-transitory computer-readable medium of claim 15, wherein the program instructions are executable for causing the processor device to interpret an enumeration pattern for the production rule engine, and wherein the shared stateless class is based on the enumeration pattern and the digital fingerprint.

17. The non-transitory computer-readable medium of claim 16, wherein the shared stateless class comprises a single-instance class for the production rule engine represented in the compiled language.

18. The non-transitory computer-readable medium of claim 14, wherein the production rule network comprises a rete network and the node comprises an alpha node in the rete network.

19. The non-transitory computer-readable medium of claim 18, wherein the compiled language is a domain-specific language.

20. The non-transitory computer-readable medium of claim 14, wherein the program instructions are executable for causing the processor device to delete an object created in the shared stateless class from the memory based on usage of the object.

* * * * *